US012750615B2

(12) United States Patent
Nie

(10) Patent No.: US 12,750,615 B2
(45) Date of Patent: Sep. 29, 2026

(54) EARPHONE WITH NOISE REDUCTION STRUCTURE

(71) Applicant: Anker Innovations Technology Co., Ltd., Changsha (CN)

(72) Inventor: Xia Nie, Shenzhen (CN)

(73) Assignee: Anker Innovations Technology Co., Ltd., Changsha (CN)

( * ) Notice: Subject to any disclaimer, the term of this patent is extended or adjusted under 35 U.S.C. 154(b) by 0 days.

(21) Appl. No.: 19/453,399

(22) Filed: Jan. 20, 2026

(65) Prior Publication Data

US 2026/0149910 A1 May 28, 2026

Related U.S. Application Data

(63) Continuation of application No. 19/036,277, filed on Jan. 24, 2025.

(30) Foreign Application Priority Data

Feb. 1, 2024 (CN) ........................ 202420264358.4

(51) Int. Cl.
*H04R 1/10* (2026.01)

(52) U.S. Cl.
CPC ......... *H04R 1/1016* (2013.01); *H04R 1/1083* (2013.01); *H04R 2460/01* (2013.01)

(58) Field of Classification Search
CPC . H04R 1/1016; H04R 1/1083; H04R 2460/01
See application file for complete search history.

(56) References Cited

U.S. PATENT DOCUMENTS

| | | | | |
|---|---|---|---|---|
| 5,748,743 | A | 5/1998 | Weeks | |
| 9,479,859 | B2 | 10/2016 | Henry et al. | |
| 11,523,205 | B2 | 12/2022 | Hatfield et al. | |
| 2008/0253583 | A1* | 10/2008 | Goldstein | H04R 3/04 381/92 |
| 2011/0058697 | A1* | 3/2011 | Shennib | H04R 25/02 381/328 |
| 2017/0048631 | A1 | 2/2017 | Kwon et al. | |
| 2020/0186906 | A1* | 6/2020 | Birch | H04R 1/1016 |
| 2021/0136478 | A1* | 5/2021 | Jou | H04R 1/1041 |
| 2021/0152924 | A1 | 5/2021 | Keady | |

(Continued)

FOREIGN PATENT DOCUMENTS

| | | |
|---|---|---|
| CN | 217825324 U | 11/2022 |
| CN | 217935903 U | 11/2022 |

(Continued)

OTHER PUBLICATIONS

Dec. 8, 2024—(CN) Notice of Allowance of Application 202420264358.4.

(Continued)

*Primary Examiner* — Daniel R Sellers
(74) *Attorney, Agent, or Firm* — Banner & Witcoff, Ltd.

(57) ABSTRACT

The disclosure describes an earphone. The earphone may comprise a main housing, and a sound outlet pipe connected to the main housing. The earphone may also comprise a cap coupled to the main housing and a wing provided around a peripheral side of the main housing. The earphone may also comprise a pressure relief channel communicating with the sound outlet pipe.

20 Claims, 10 Drawing Sheets

(56) References Cited

U.S. PATENT DOCUMENTS

| | | | |
|---|---|---|---|
| 2023/0133906 A1 | 5/2023 | Kamimura et al. | |
| 2023/0269514 A1* | 8/2023 | Cousins .............. | G06F 3/04144 381/74 |
| 2023/0300515 A1 | 9/2023 | Takubo | |
| 2024/0073578 A1 | 2/2024 | Takano et al. | |
| 2024/0414467 A1 | 12/2024 | Mosgrove et al. | |

FOREIGN PATENT DOCUMENTS

| | | | |
|---|---|---|---|
| CN | 116320945 | A | 6/2023 |
| WO | 2019081650 | A1 | 5/2019 |
| WO | 2021165234 | A1 | 8/2021 |
| WO | 2023096641 | A1 | 6/2023 |
| WO | 2023238455 | A1 | 12/2023 |

OTHER PUBLICATIONS

May 23, 2025 (EP) Search Report of Application 25154638.

Sep. 2, 2020 (JP) 1st Office Action of Patent Application 2025-010691.

* cited by examiner

A-A

EARPHONE WITH NOISE REDUCTION STRUCTURE

CROSS-REFERENCE TO RELATED APPLICATIONS

The present disclosure is a continuation application of U.S. application Ser. No. 19/036,277, filed on Jan. 24, 2025, which claims priority of the Chinese Patent Application No. 202420264358.4, filed on Feb. 1, 2024, before the China National Intellectual Property Administration, entitled "Earphone," each of which is incorporated herein by reference in its entirety.

FIELD

The present disclosure relates to the technical field of earphones.

BACKGROUND

An earphone is an apparatus that can convert an electrical signal into sound, which is generally configured to be connected to a media player, a mobile phone or other audio devices and to transmit the sound to users by wearing on their ears.

Earphones can be divided into two types: in-ear and over-ear. An in-ear earphone usually has an earplug on its body, and generally isolates noise in a sealing manner. When the earplug is inserted into an ear canal of a user, a closed space is formed between the earplug and the ear canal. However, sound isolating effect of the earplugs is limited, and external noise can still penetrate the earplug and enter the ear canal.

SUMMARY

The disclosure provides an earphone, which can effectively reduce external noise entering an ear canal during wearing of the earphone.

In a first aspect, the disclosure describes an earphone comprising: a body comprising a main housing and a sound outlet pipe connected to the main housing; and a cap comprising a fixing part and a first noise reduction part e connected to each other. The fixing part is sleeved on the sound outlet pipe, and the first noise reduction part is provided around a peripheral side of the fixing part. The earphone further comprises a wing comprising a second noise reduction part. The second noise reduction part is provided around a peripheral side of the main housing. A cavity is formed between the first noise reduction part and the second noise reduction part, and is configured to block environmental noise.

The disclosure has beneficial effects at least based on the structure that the cap is provided with the first noise reduction part and the wing is provided with the second noise reduction part. The cap is connected to the sound outlet pipe, the first noise reduction part is provided around a periphery of the sound outlet pipe, the wing is connected to the main housing, and the second noise reduction part is provided around a peripheral side of the main housing, so that multiple blocking of the noise entering a user's ear can be realized by the first noise reduction part and the second noise reduction part. In addition, because the cap and the wing are independent components, a user can choose appropriate sizes according to a size of his/her own ear canal, and can freely disassemble and replace the cap and the wing, thus improving wearing comfort of the earphone.

BRIEF DESCRIPTION OF THE DRAWINGS

In order to more clearly illustrate examples of the disclosure or technical solutions in the related art, drawings that need to be used in description of the examples or the related art are briefly introduced below, and it will be apparent that the drawings in the following description are only some examples of the disclosure, and other drawings may be obtained by those skilled in the art without inventive work based on these drawings.

Figure 1:
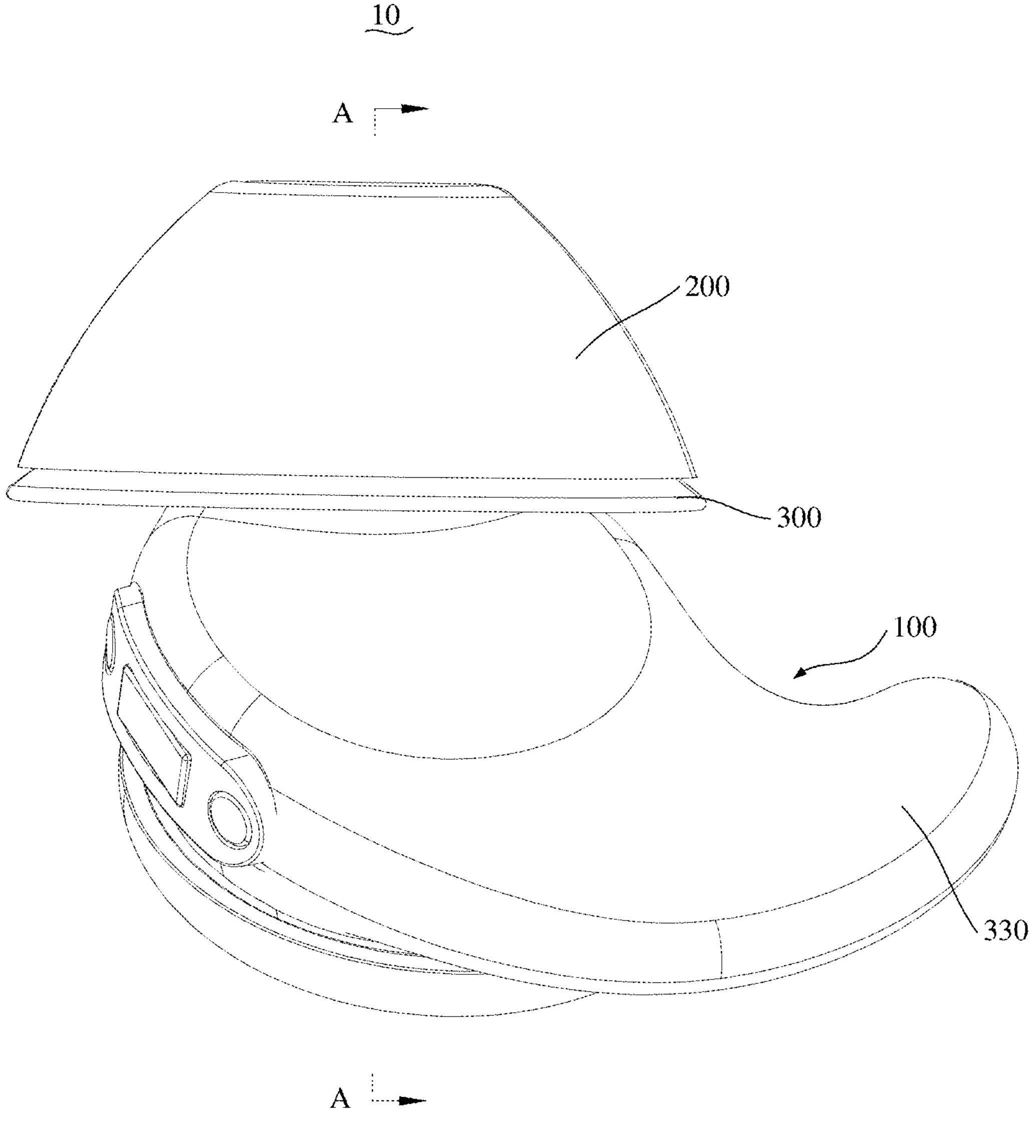
FIG. 1 is a schematic structural view of an earphone according to an example of the present disclosure.

Reference numerals: 10. Earphone; 100. Body; 110. Main Housing; 120. Sound Outlet Pipe; 122. Sound Outlet Hole; 123. Limiting Structure; 124. Fixing Structure; 200. Cap; 210. Fixing Part; 211. Positioning Structure; 212. Mounting Structure; 220. First Noise Reduction Part; 221. Outer End Face; 222. Connecting Segment; 223. Noise Reduction Segment; 224. First Ventilation Channel; 225. Second Ventilation Channel; 230. Sound Outlet Channel; 300. Wing; 310. Mounting Part; 320. Second Noise Reduction Part; 321. Groove; 322. Protrusion; 330. Brace; 400. Noise Reduction Cavity; 500. Pressure Relief Channel; 510. First Channel Segment; 520. Second Channel Segment; 600. Speaker; 700. Electronic control Module.

DETAILED DESCRIPTION

The present disclosure will be described in further detail below with reference to the accompanying drawings in order to provide a clearer understanding of the purpose, technical solution and advantages of the present disclosure.

When the following description refers to the drawings, the same numbers in different drawings represent the same or similar elements unless otherwise indicated. The implementations described in the following examples do not represent all implementations consistent with the present disclosure. Rather, they are merely examples of the apparatus and method consistent with some aspects of the present disclosure as detailed in the appended claims.

It should be understood that, the terms "first", "second", and the like are used for descriptive purposes only and should not be construed as indicating or implying relative importance in the description of the present disclosure. The specific meanings of the above terms in the disclosure may be understood in specific circumstances by those skilled in the art. Moreover, "a plurality of" means two or more unless otherwise stated in the description of the disclosure. "And/or" describes an associative relationship and indicates that there may be three relationships. For example, A and/or B may mean: three cases of A alone, A and B at the same time, and B alone. The character "/" generally indicates that the former and latter associated objects are in an "or" relationship.

Unless defined otherwise, all technical and scientific terms used herein have the same meaning as commonly understood by one of ordinary skill in the art to which this disclosure belongs. The terms used in the description are only for the purpose of describing specific examples and are not taken as a limitation of the present disclosure. As used herein, the term "and/or" includes any and all combinations of one or more related listed items.

FIG. 1 shows a schematic structural view of an earphone 10 according to an example of the present disclosure. The earphone 10 can be a wired or wireless in-ear earphone 10, which can be in communication connection with devices such as mobile phones, computers, MP3 players, and wearable audio devices. It is worth understood that the earphone 10 can also be designed in other forms, such as an around-ear earphone 10, without deviating from conception of the disclosure.

The earphone 10 may include a body 100, a cap 200 (e.g., an ear tip), and a wing 300 (e.g., an ear wing). The cap 200 and the wing 300 are detachably connected to the body 100.

Figure 2:
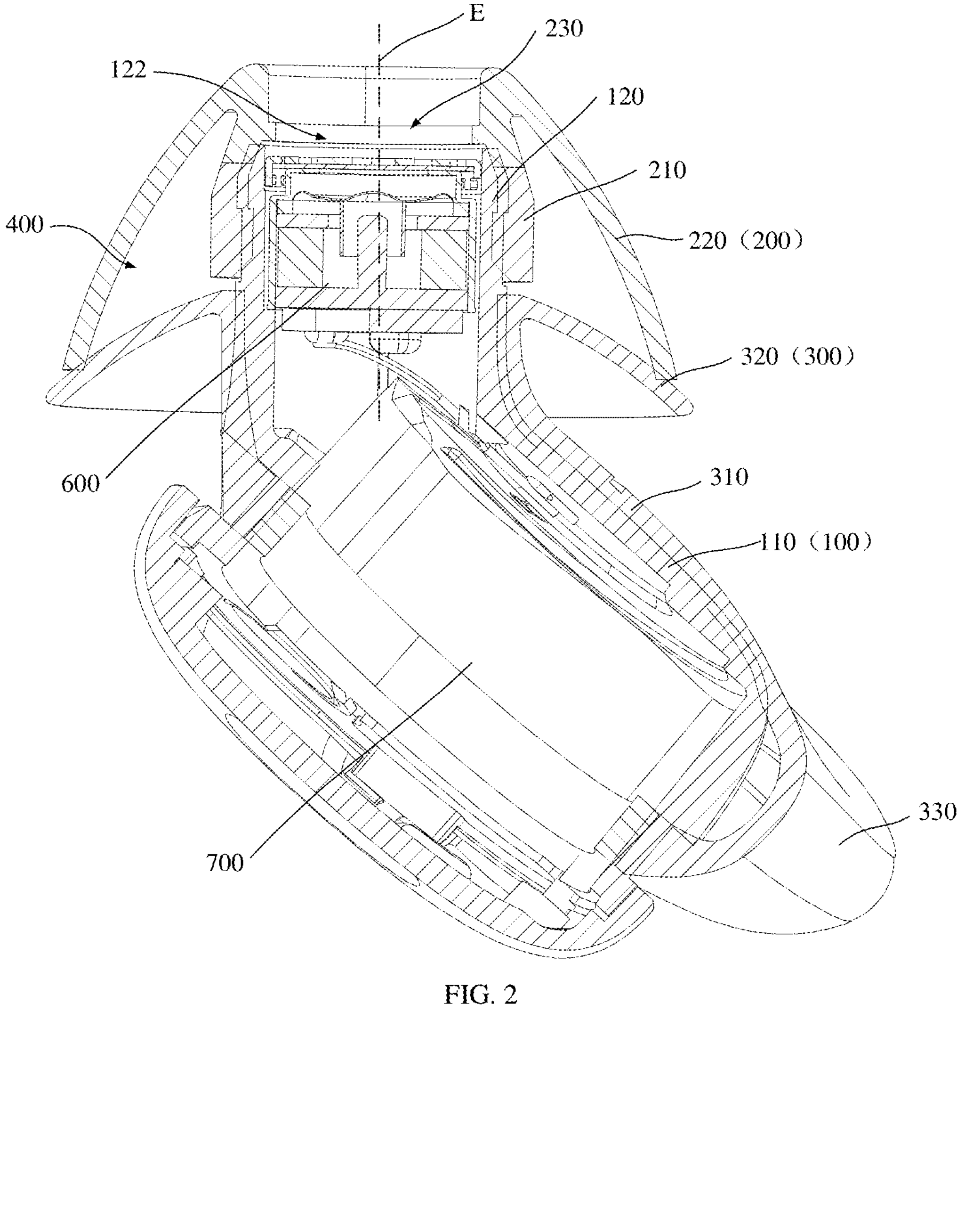
FIG. 2 is a sectional view taken along a line A-A in FIG. 1.

Referring to FIG. 2, the body 100 may include a main housing 110 and a sound outlet pipe 120. The sound outlet pipe 120 is connected with the main housing 110, and the main housing 110 and the sound outlet pipe 120 can be integrally molded by injection molding, or provided in a split structure and are fixedly connected by clamping or through a connector. The sound outlet pipe 120 has a sound channel, and a sound outlet hole 122 communicating with the sound channel is provided at an end of the sound outlet pipe 120. The main housing 110 may be provided with an accommodating cavity, and the sound channel communicates with the accommodating cavity.

The earphone 10 may further include an electronic control module 700 (e.g., a controller, a control assembly) and a speaker 600, etc. The speaker 600 is provided in the sound outlet pipe 120 and can transmit sound to the outside through the sound outlet pipe 120, and the electronic control module 700 is provided in the accommodating cavity. The electronic control module 700 may include an electronic control plate, a battery and the like. An axial direction of the sound outlet pipe 120 may be provided at an included angle with an extending direction of the main housing 110. The main housing 110 may be in a flat form, and the electronic control module 700 can be provided in a flat block structure or box structure to adapt to a shape of the main housing 110. In this way, an overall structure of the earphone 10 is relatively small, which facilitates attaching the earphone 10 to an ear, and the earphone 10 does not protrude too much to an outside of the ear, which is especially suitable for sleeping.

The cap 200 has a sound outlet channel 230. The cap 200 includes a fixing part 210 and a first noise reduction part 220 (e.g., a deformable layer or panel, a memory foam layer or panel) which are connected with each other. When the fixing part 210 is sleeved on the sound outlet pipe 120, the sound outlet channel 230 communicates with the sound outlet hole 122, and the first noise reduction part 220 is provided around a peripheral side of the sound outlet pipe 120. In a wearing state (e.g., when the earphone 10 is worn by a user), the cap 200 extends into an ear canal, and sound played by the speaker 600 can be transmitted to the ear canal through the sound channel, the sound outlet hole 122 and the sound outlet channel 230 in turn.

The wing 300 includes a mounting part 310 and a second noise reduction part 320 which are connected with each other. The mounting part 310 is connected with the main housing 110, and the second noise reduction part 320 is provided around a peripheral side of the main housing 110. Further, the wing 300 includes a brace 330 located at an end of the mounting part 310 away from the second noise reduction part 320. In other words, in a circumferential direction of the earphone 10, a brace 330 protruding outward is provided at an end of the wing 300 away from the mounting part 310, and the brace 330 is configured to abut against antihelix when the wing 300 is located in a concha cavity. The brace 330 can be configured to fix the earphone 10 to the ear and provide additional stability and comfort. During use, by inserting the wing 300 into an auricle, the earphone 10 can better fit the ear, and thus the earphone 10 can be prevented from falling or shaking during sports or other activities.

Figure 3:
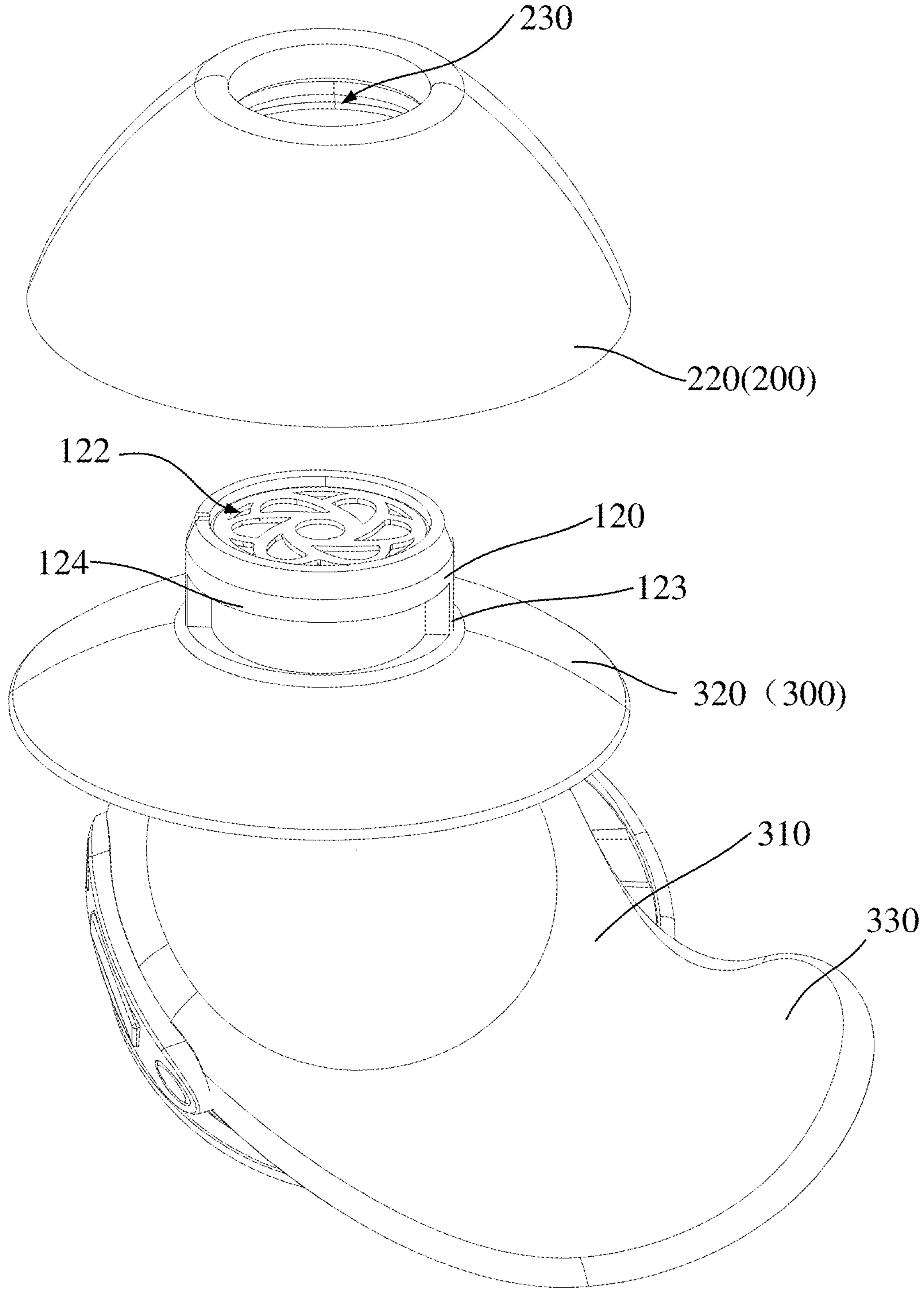
FIG. 3 is an exploded view of an earphone according to an example of the present disclosure.

In this disclosure, referring to FIG. 3, the first noise reduction part 220 is provided on the cap 200, and the second noise reduction part 320 is provided on the wing 300. A noise reduction cavity 400 is constructed (e.g., formed) between the first noise reduction part 220 and the second noise reduction part 320, and is configured to block environmental noise entering a user's earhole. Since the cap 200 and the wing 300 are independent components, they can be freely disassembled and replaced. The user can choose an appropriate size according to a size of his/her own ear canal, thus improving wearing comfort of the earphone 10.

In some examples, the first noise reduction part 220 abuts against the second noise reduction part 320, and the first noise reduction part 220, the second noise reduction part 320 and an outer wall of the body 100 jointly enclose the noise reduction cavity 400. It can be understood that mutual abutment of the first noise reduction part 220 and the second noise reduction part 320 may be that a free end of the first noise reduction part 220 away from the fixing part 210 abuts against an outer surface of the second noise reduction part 320, or that a free end of the second noise reduction part 320 away from the mounting part 310 abuts against an inner surface of the first noise reduction part 220. Here, specific forms of abutment of the first noise reduction part 220 against the second noise reduction part 320 are not limited in this disclosure.

It should be noted that in a natural state, the first noise reduction part 220 and the second noise reduction part 320 may or may not be in contact (e.g., abut against each other). If the first noise reduction part 220 and the second noise are not in contact, when the earphone is worn, the first noise reduction part 220 may deform under compression from the inner wall of the ear canal, causing it to abut against the second noise reduction part 320 and form the noise reduction cavity 400. For example, a gap may be present between the first noise reduction part 220 and the second noise reduction part 320. When the user wears the earphone 10 according to the present disclosure, part of external noise may be intercepted by the second noise reduction part 320, and part of external noise may enter the noise reduction cavity 400 and is damped, absorbed and attenuated in the noise reduction cavity 400, and meanwhile distorted, thus reducing energy and frequency characteristics thereof, so that it is difficult to penetrate the first noise reduction part 220 and enter the user's ear canal.

It is further noted that the noise reduction cavity 400 can be enclosed and formed by the first noise reduction part 220, the second noise reduction part 320 and an outer wall of the sound outlet pipe 120, or by the first noise reduction part 220, the second noise reduction part 320, the outer wall of the sound outlet pipe 120 and part of an outer wall of the main housing 110, or by the first noise reduction part 220 and the second noise reduction part 320. In the form where the first noise reduction part 220 and the second noise reduction part 320 jointly enclose and form the noise reduction cavity 400, the fixing part 210 covers the outer wall of the sound outlet pipe 120, and the mounting part 310 may abut against the fixing part 210, while the free end of the first noise reduction part 220 (e.g., an end away from the fixing part 210) abuts against the free end of the second noise reduction part 320 (e.g., the end away from the mounting part 310). In this way, the first noise reduction part 220 and the second noise reduction part 320 jointly enclose and/or form the noise reduction cavity 400.

In order to improve stability of the abutment of the first noise reduction part 220 against the second noise reduction part 320, an outer end face 221 of the first noise reduction part 220 away from the fixing part 210 does not exceed an outer end of the second noise reduction part 320 away from the mounting part 310. For example, in the natural state, the outer end face 221 of the first noise reduction part 220 away from the fixing part 210 abuts on the second noise reduction part 320. In the wearing state, even if the first noise reduction part 220 extends into the ear canal and is subject to part of pressure, the outer end face 221 of the first noise reduction part 220 away from the fixing part 210 shrinks to deform, at which time the outer end face 221 of the first noise reduction part 220 away from the fixing part 210 always abuts against the second noise reduction part 320, thus effectively improving sealing of the noise reduction cavity 400.

It can be understood that the noise reduction cavity 400 is used to damp, absorb and attenuate noise, and thus the noise reduction cavity 400 is provided around the sound outlet pipe 120, which can isolate noise from all directions and further improve noise reduction effect of the earphone 10. The noise reduction cavity 400 can be provided around the sound outlet pipe 120 for the earphone 10. In some structural forms, the noise reduction cavity 400 can also be provided only in a direction where noise is easier to enter.

Referring to FIG. 2, an outer diameter of the first noise reduction part 220 and an outer diameter of the second noise reduction part 320 are both set to reduce in an axial direction E of the sound outlet pipe 120 away from the main housing 110. It should be noted that the outer diameter of the first noise reduction part 220 is set to reduce in the axial direction E of the sound outlet pipe 120 away from the main housing 110, and the earphone 10 can adapt to a shape of the ear canal during wearing and is more comfortable to wear. However, during wearing, the first noise reduction part 220 may be squeezed by the ear canal to contract and deform. In the present disclosure, the outer diameter of the second noise reduction part 320 is also set to reduce gradually in the axial direction E of the sound outlet pipe 120 away from the main housing 110, so that a supporting force of the second noise reduction part 320 against the first noise reduction part 220 can be reduced when the first noise reduction part 220 and the second noise reduction part 320 abut against each other, which can avoid that the first noise reduction part 220 is difficult to deform in the ear canal and comfort in wearing is reduced, and can result in better sealing of the noise reduction cavity 400. In other structural forms, the second noise reduction part 320 can also be horizontally provided in the axial direction of the sound outlet pipe 120. In this case, when the first noise reduction part 220 and the second noise reduction part 320 are connected with each other (e.g., attached to each other), they can be in a triangular support state, and meanwhile can maintain the noise reduction cavity 400 with good sealing.

Figure 11:
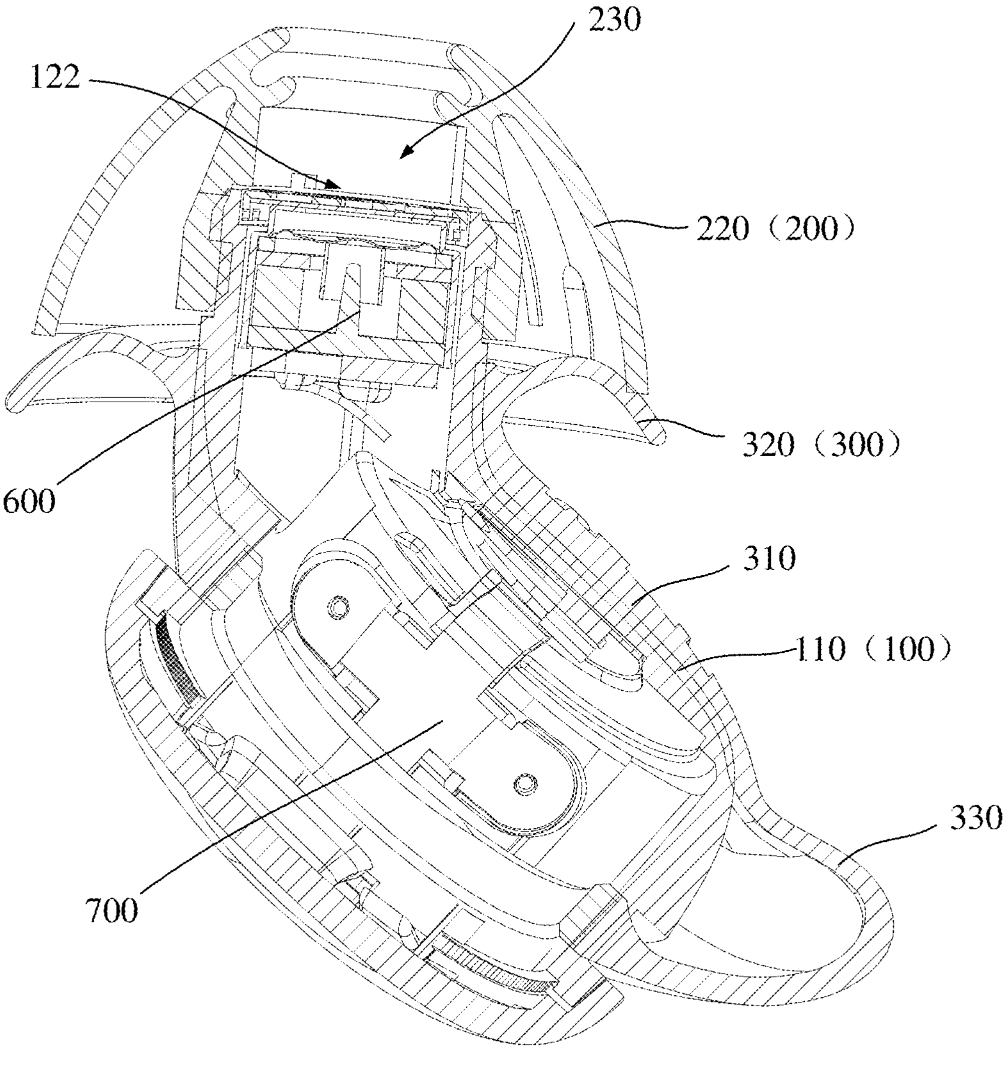
FIG. 11 is a sectional view of an earphone according to another example of the present disclosure.

In some examples of the present disclosure, referring to FIG. 11, the second noise reduction part 320 is located at a side of the first noise reduction part 220 facing the main housing 110, and the second noise reduction part 320 is configured with a middle part raised toward the sound outlet hole 122. In this way, the free end of the second noise reduction part 320 has a tendency to deform inward, and because the middle part is set raised, and an elastic force for outward deformation can be further provided for the free end of the second noise reduction part 320, so that the second noise reduction part 320 has good flexibility. In this way, when the first noise reduction part 220 is squeezed by the ear during wearing by the user, the second noise reduction part 320 can linearly deform according to a stress, thus improving comfort and sealing during wearing by the user.

In some examples, hardness of the second noise reduction part 320 is greater than hardness of the first noise reduction part 220. Specifically, the first noise reduction part 220 abuts against the second noise reduction part 320 to form the closed noise reduction cavity 400, and thus, in order to ensure tightness in abutment of the first noise reduction part 220 against the second noise reduction part 320 during wearing, the hardness of the second noise reduction part 320 may be slightly greater than the hardness of the first noise reduction part 220, so that the second noise reduction part 320 has certain supporting capability for the first noise reduction part 220. Thus, the sealing effect of the noise reduction cavity 400 is better and the noise reduction effect can be improved.

Further, the first noise reduction part 220 can extend in a direction from a side of the sound outlet pipe 120 away from the main housing 110 to a side of the sound outlet pipe 120 close to the main housing 110, and the second noise reduction part 320 can extend in a direction from a joint between the sound outlet pipe 120 and the main housing 110 to a side of the main housing away from the sound outlet pipe 120. In this way, a noise reduction cavity 400 with a radial length slightly larger than that of the sound outlet pipe 120 can be formed at an outside of the sound outlet pipe 120, and a volume of the noise reduction cavity 400 can be set to be relatively large, which can effectively increase an area of the noise reduction cavity 400 enclosing the sound outlet pipe 120, thereby improving the noise reduction effect of the disclosure.

In order to further improve sealing of the noise reduction cavity 400 and thus improve the noise reduction effect, examples of the disclosure provide several structural forms as follows.

Figure 6:
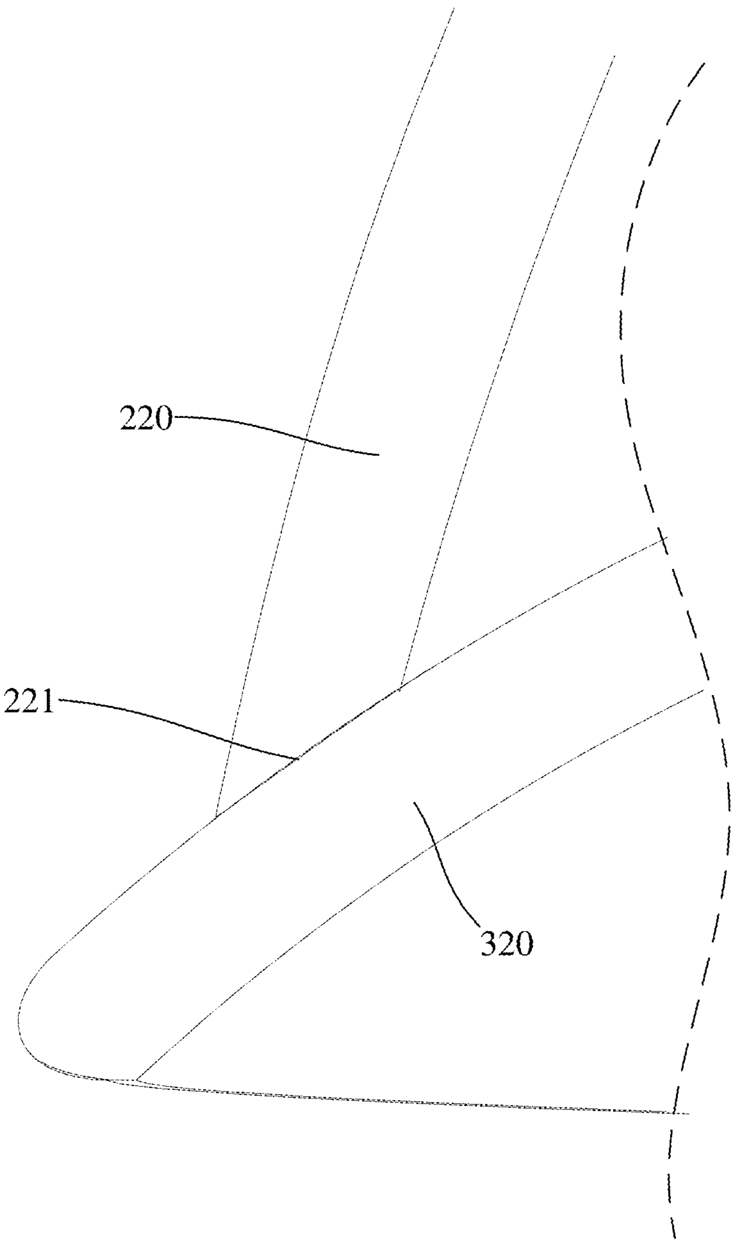
FIG. 6 is a state view of a first noise reduction part and a second noise reduction part abutting against each other according to an example of the present disclosure.

Referring to FIG. 6, the outer end face 221 (e.g., lower end) of the first noise reduction part 220 away from the fixing part 210 fits a profile of a side of the second noise reduction part 320 facing the first noise reduction part 220. Compared with a form in which one of contact points of the outer end face 221 of the first noise reduction part 220 away from the fixing part 210 abuts against a side of the second noise reduction part 320 facing the first noise reduction part 220, a contact area between the first noise reduction part 220 and the second noise reduction part 320 can be increased in the disclosure, thus improving stability in abutment between first noise reduction part 220 and the second noise reduction part 320, and further improving sealing of the noise reduction parts.

Figure 7:
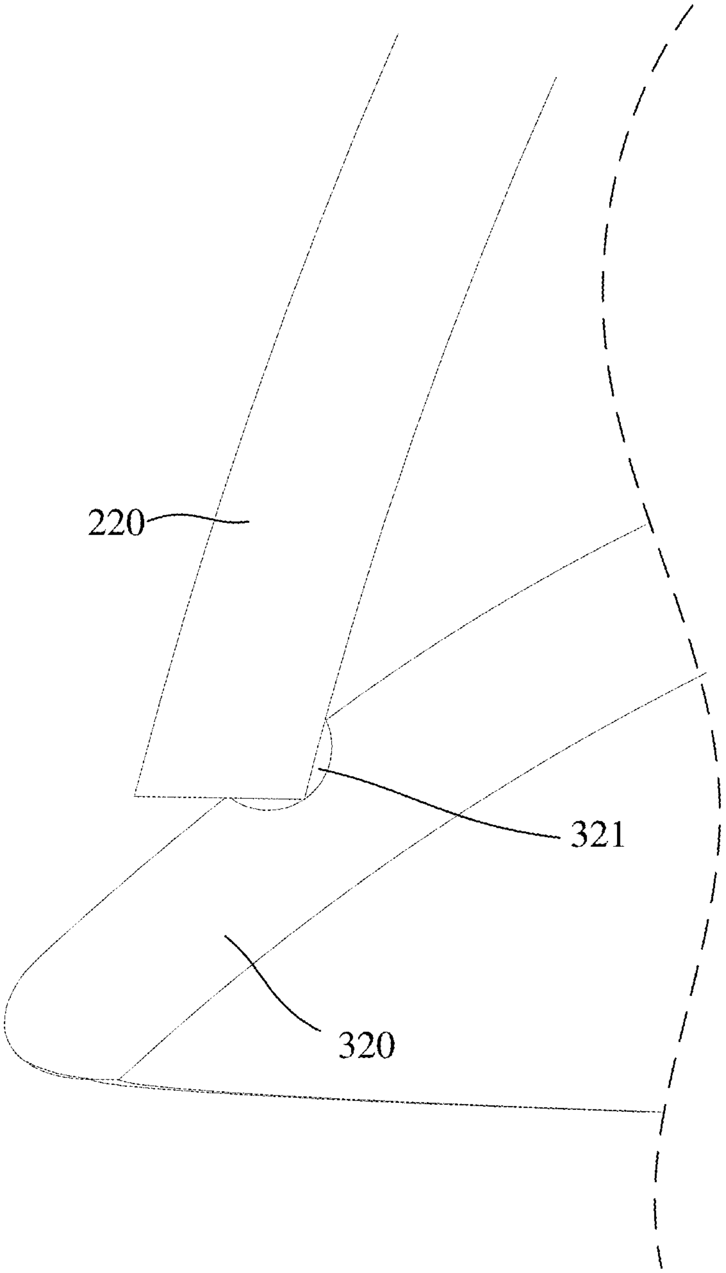
FIG. 7 is a state view of a first noise reduction part and a second noise reduction part abutting against each other according to another example of the present disclosure.

Referring to FIG. 7, a groove 321 is formed on the side of the second noise reduction part 320 facing the first noise reduction part 220. When the outer end face 221 of the first noise reduction part 220 away from the fixing part 210 abuts against the groove 321, the first noise reduction part 220 has at least two contact points with the groove 321. As shown in FIG. 7, the first noise reduction part 220 has three contact points with the groove 321, the outer end face 221 of the first noise reduction part 220 can abut against a bottom wall of the groove 321 and/or a vertex of a side wall of the groove 321, and the side of the first noise reduction part 220 facing the sound outlet pipe 120 abuts against the vertex of the side wall of the groove 321. In this way, there are multiple contact points between the first noise reduction part 220 and the second noise reduction part 320, so that multiple sealing lines are formed on a peripheral side of the noise reduction cavity 400, which can further improve the sealing and noise reduction effect of the noise reduction cavity 400. In addition, the groove 321 can cause the first noise reduction part 220 to stably abut against the second noise reduction part 320, further improving the sealing of the noise reduction cavity 400.

Figure 8:
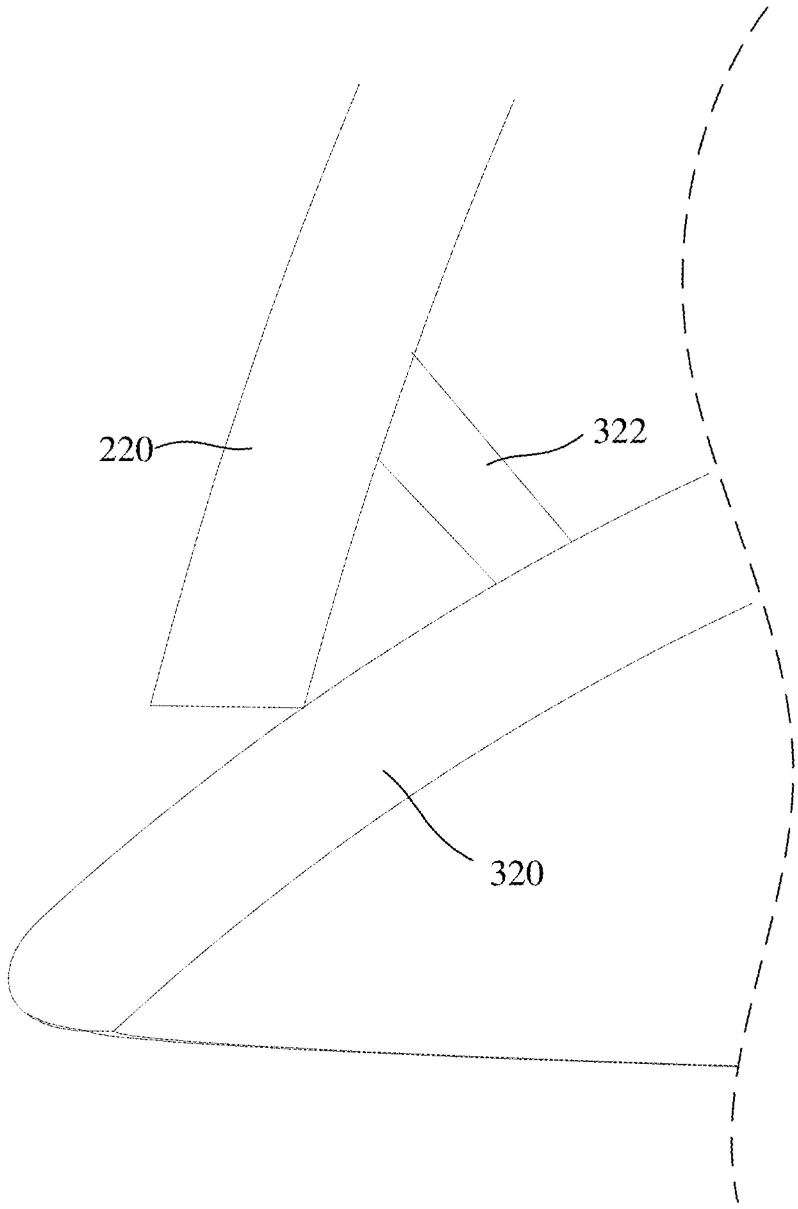
FIG. 8 is a state view of a first noise reduction part and a second noise reduction part abutting against each other according to yet another example of the present disclosure.

Referring to FIG. 8, a protrusion 322 is formed on the side of the second noise reduction part 320 facing the first noise reduction part 220. At this time, the first noise reduction part 220 has two contact points with the second noise reduction part 320. Specifically, the outer end face 221 of the first noise reduction part 220 abuts against the second noise reduction part 320, and the side of the first noise reduction part 220 facing the sound outlet pipe 120 abuts against the protrusion 322, and thus the first noise reduction part 220 has two contact points with the second noise reduction part 320, thereby forming two sealing lines around the noise reduction cavity 400, which can improve the noise reduction effect. Alternatively, the protrusion 322 is provided on the side of the first noise reduction part 220 facing the second noise reduction part 320. At this time, both the outer end face 221 of the first noise reduction part 220 and the protrusion 322 abut against the second noise reduction part 320.

It should be noted that above cases can be combined or one of them can be selected.

In order to achieve the noise reduction effect of the earphone 10 according to the present disclosure, the present disclosure provides another example. In the wearing state, the first noise reduction part 220 and the second noise reduction part 320 respectively abut against different positions of the user's ear. Specifically, during wearing, the first noise reduction part 220 can fit the ear canal of the user and the second noise reduction part 320 can fit a surface of the user's ear. At this time, the first noise reduction part 220, the second noise reduction part 320, the user's ear and an outer wall of the body 100 jointly enclose the noise reduction cavity 400.

It can be understood that the first noise reduction part 220 is in close contact with the ear canal, is made of a soft material which can improve comfort in inserting into the ear, has good deformation capability, and can effectively fit the ear canal of the user to block sound around the user. The fixing part 210 is used to be connected with the sound outlet pipe 120, which needs to maintain certain stability and shape to ensure stability of installation and connection and prevent the cap 200 from falling into the ear canal when the sound outlet pipe 120 is inserted into the ear canal. Therefore, the fixing part 210 can be made of a material with large hardness. The first noise reduction part 220 and the fixing part 210 can be made of materials with different hardness such as silicone rubber, polyurethane or epoxy resin. Here, the materials of the first noise reduction part 220 and the fixing part 210 are not specifically limited in this disclosure.

In order to prevent the first noise reduction part 220 and the second noise reduction part 320 from bonding during abutment, which may affect wearing feeling, an anti-adhesive agent layer is provided on a surface where the first noise reduction part 220 and the second noise reduction part 320 abut against each other. Specifically, the anti-adhesive agent layer may be an oil layer formed by spraying oil on surfaces of the first noise reduction part 220 and the second noise reduction part 320.

Figure 4:
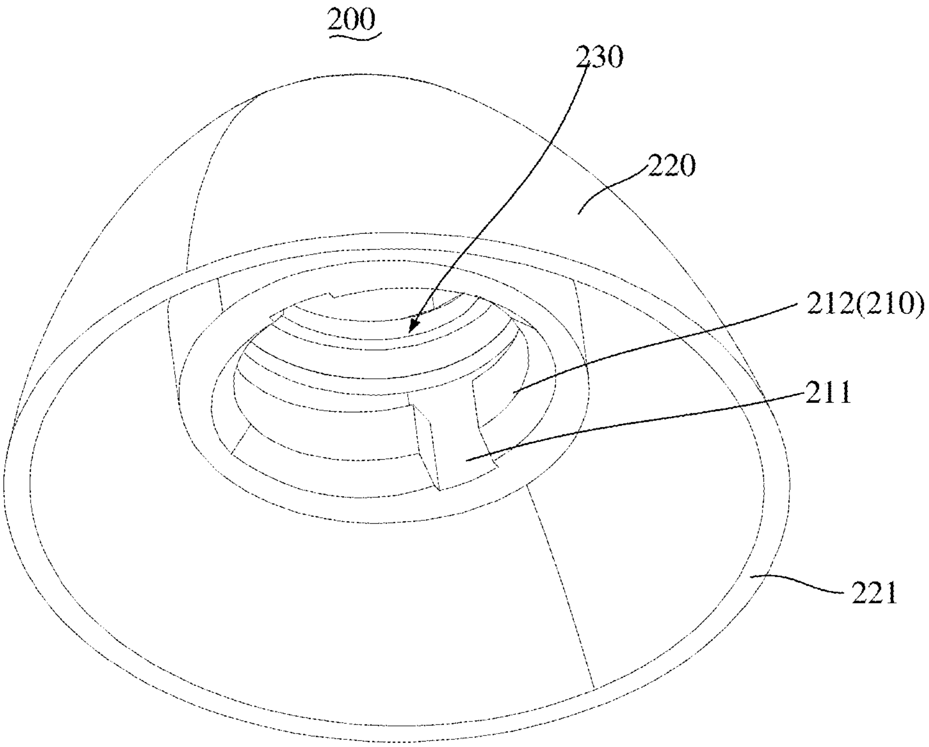
FIG. 4 is a schematic structural view of a cap according to an example of the present disclosure.

In some structural forms, the fixing part 210 has a sleeve structure, which facilitates sleeving on a periphery of the sound outlet pipe 120. In order to improve stability of the sleeving of the fixing part 210 and the sound outlet pipe 120, referring to FIGS. 3 and 4, a mounting structure 212 is provided on an inner wall of the fixing part 210, and a fixing structure 124 adapted to the mounting structure 212 is provided at a periphery of the sound outlet pipe 120. The mounting structure 212 is fixed relative to the fixing structure 124, so that the cap 200 can be stably connected with the sound outlet pipe 120. The mounting structure 212 and the fixing structure 124 may be provided as a clamping protrusion or a clamping groove. The fixing part (210) may have a circular ridge (e.g., the mounting structure 212) on its inner wall that fits snugly into a corresponding groove (e.g., the fixing structure 124) around the periphery of the sound outlet pipe (120). In this way, the fixing part 210 and the sound outlet pipe 120 are clamped, which facilitates disassembly and replacement.

Further, a positioning structure 211 may be provided on the inner wall of the fixing part 210, and a limiting structure 123 may be further provided on the outer wall of the sound outlet pipe 120. The positioning structure 211 is clamped with the limiting structure 123, which can prevent the cap 200 from rotating on the sound outlet pipe 120 and improve comfort of the user during wearing. The positioning structure 211 and the limiting structure 123 can also be similarly set in a form of a clamping protrusion or a clamping groove, which is not limited in this disclosure. For a processing form of the cap 200 according to the present disclosure, secondary injection molding can be adopted, for example, the fixing part 210 is first injection molded, and then the first noise reduction portion 220 is injection molded on the fixing part 210. Alternatively, the fixing part 210 and the first noise reduction part 220 may be shaped separately, and the fixing part 210 and the first noise reduction part 220 may be integrally connected whole by adhesive bonding, hot melt connection, etc.

Figure 5:
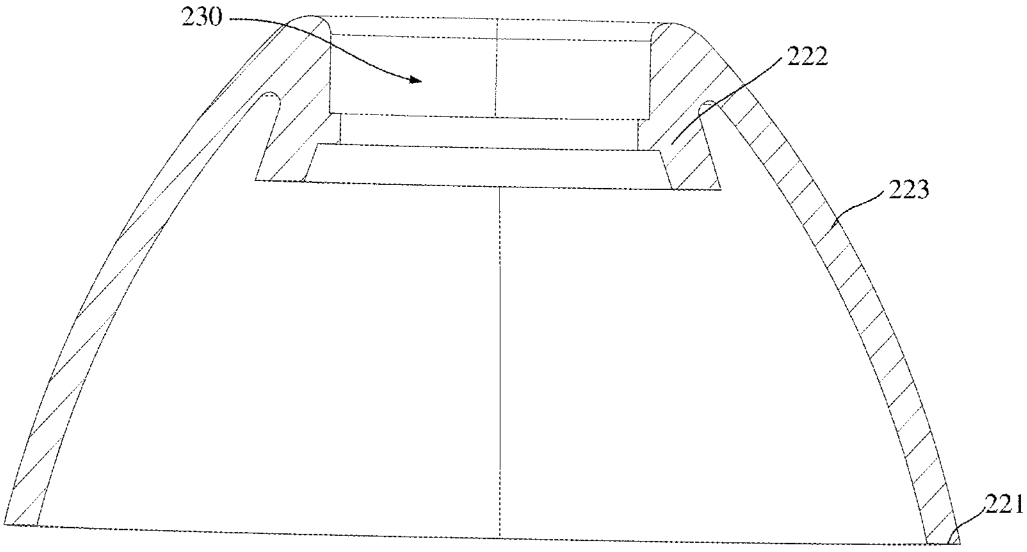
FIG. 5 is a schematic structural view of a first noise reduction part according to an example of the present disclosure.

Referring to FIG. 5, the first noise reduction part 220 according to the present disclosure may include a connecting segment 222 and a noise reduction segment 223, one end of the connecting segment 222 is connected with the fixing part 210, and the other end of the connecting segment 222 is connected with the noise reduction segment 223. At least part of the connecting segment 222 extends out of a side of the sound outlet pipe 120 in an axial direction E of the sound outlet pipe 120 and away from the main housing 110, and this part of the connecting segment 222 forms the sound outlet channel 230, and an end of the noise reduction segment 223 away from the second noise reduction part 320 abuts against an inner side wall of the connecting segment 222. It can be understood that at least part of a front end of the cap 200 may extend into the user's ear canal, and the connecting segment 222 of the first noise reduction part 220 located at the side in the axial direction E of the sound outlet pipe 120 and away from the main housing 110 can be located in the ear canal. The cap 200 is soft in texture, and thus can improve tightness between the user's ear canal and the cap 200, and can also prevent the sound outlet pipe 120 from damaging the ear canal and improve the comfort in inserting into the ear.

The mounting part 310 of the wing 300 is sleeved on an outer side of the main housing 110, and can adopt a protective film structure made of a soft material, which can adapt to a shape of the main housing 110, or can be sleeved on the main housing 110 only by ductility of its material. However, in some structural forms, the second noise reduction part 320 can cover a surface of the user's ear to form the noise reduction cavity 400, and can also abut against the first noise reduction part 220 to form the noise reduction cavity 400. Thus, the second noise reduction part 320 may be made of a soft material. The wing 300 according to the present disclosure can be integrally molded and made of silicone rubber, polyurethane, epoxy resin, or other materials.

In order to prevent uncomfortable feeling of the ear caused by occlusion effect generated by increased pressure in the ear canal and a front cavity as the sound outlet pipe 120 and the ear cap 200 are inserted into the ear canal when the earphone 10 is worn, a pressure relief channel 500 is further included in the disclosure, and the pressure relief channel 500 communicates with the sound outlet hole 122 and the outside.

Figure 9:
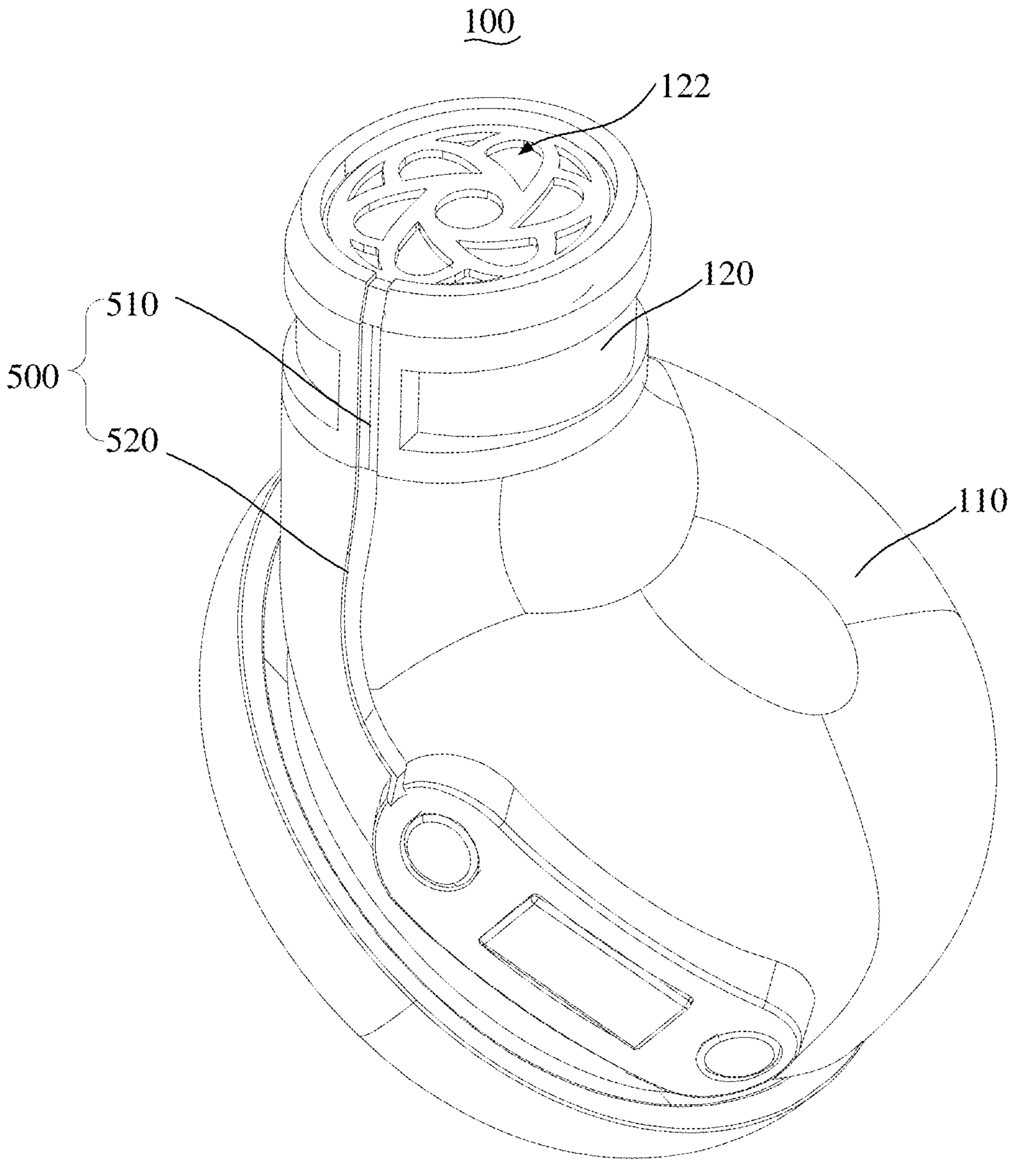
FIG. 9 is a schematic structural view of a body of an earphone according to an example of the present disclosure.

Referring to FIG. 9, in some structural forms, the pressure relief channel 500 includes a first channel segment 510 and a second channel segment 520 which communicate with each other. The first channel segment 510 is formed in a wall body of the sound outlet pipe 120 and communicates with the sound outlet hole 122, and the second channel segment 520 is formed in a wall body of the main housing 110 and communicates with the outside. The first channel segment 510 and the second channel segment 520 can be respectively formed by recessing a wall surface of the sound outlet pipe 120 and a wall surface of the main housing 110.

In some connection modes, one end of the first channel segment 510 can communicate with the sound hole 122, and the other end of the first channel segment 510 can communicate with the noise reduction cavity 400; one end of the second channel segment 520 can communicate with the noise reduction cavity 400, and the other end of the second channel segment 520 can communicate with the outside. In this way, if noise enters the pressure relief channel 500, the noise may be first damped, absorbed and attenuated by the noise reduction cavity 400, further improving the noise reduction effect of the disclosure. In addition, the pressure relief channel 500 may also be an air duct. A mounting groove is provided on the wall body of the sound outlet pipe 120 and the main housing 110, and the air duct is embedded in the mounting groove. One end of the air duct communicates with the sound outlet hole 122, and the other end of the air duct communicates with the outside, thereby realizing functions of air guide and pressure relief. Here, the specific form of the pressure relief channel 500 is not limited in the disclosure.

Figure 10:
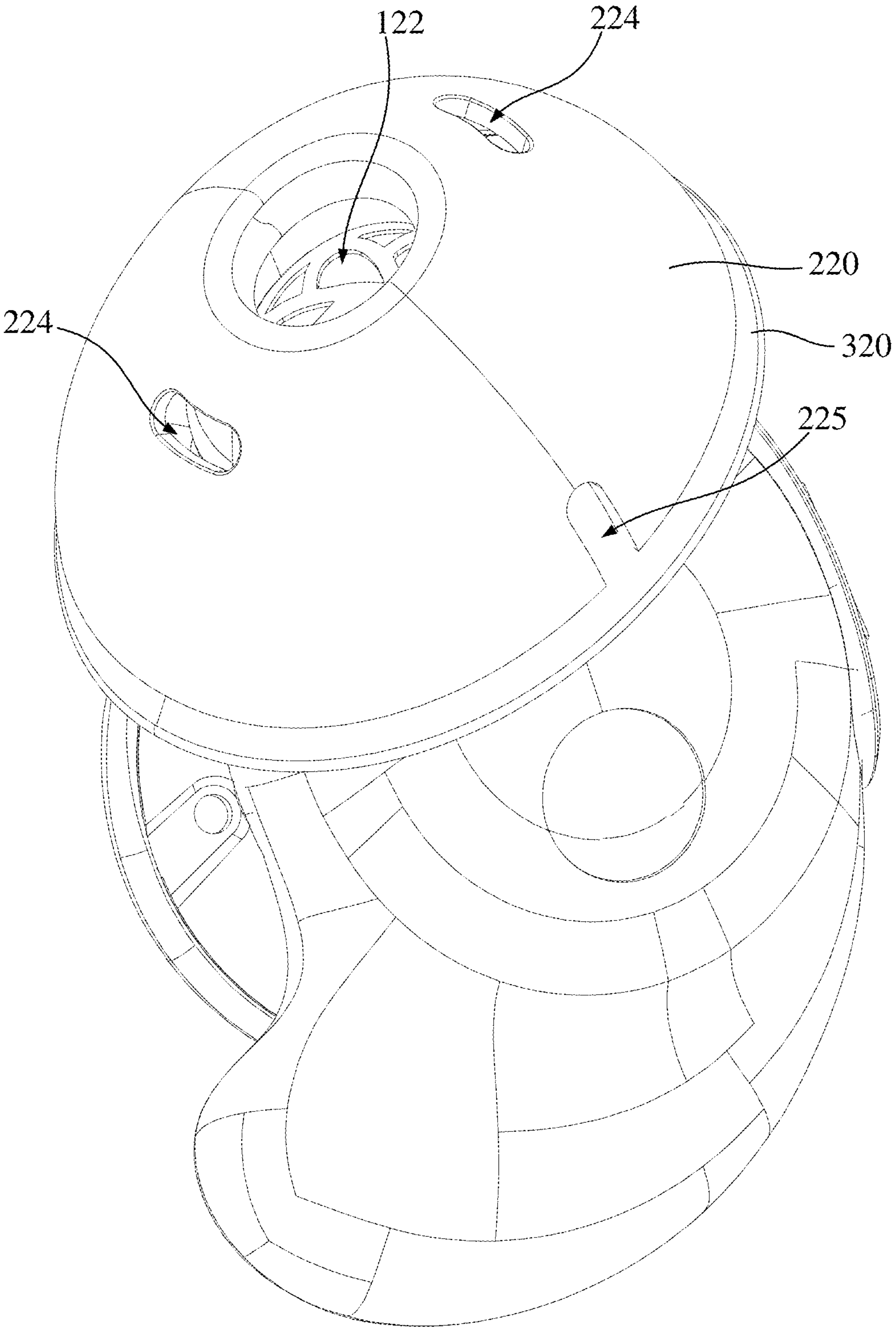
FIG. 10 is a schematic structural view of an earphone according to another example of the present disclosure.

Similarly, in order to prevent uncomfortable feeling of the ear caused by occlusion effect generated by increased pressure in the ear canal and the front cavity while the earphone 10 is worn, in addition to providing the pressure relief channel 500 described above, other means can be adopted in this disclosure. For example, referring to FIG. 10, the first noise reduction part 220 is provided with a first ventilation channel 224 and a second ventilation channel 225, or the second ventilation channel 225 is provided on the second noise reduction part 320, or the second ventilation channel 225 is defined by the first noise reduction part 220 and the second noise reduction part 320 jointly.

Specifically, when the free end of the first noise reduction part 220 away from the fixing part 210 abuts against the outer surface of the second noise reduction part 320, an outer periphery of the first noise reduction part 220 is provided with the second ventilation channel 225. Alternatively, when the free end of the second noise reduction part 320 away from the mounting part 310 abuts against the inner surface of the first noise reduction part 220, an outer periphery of the second noise reduction part 320 is provided with the second ventilation channel 225.

The first ventilation channel 224 is located closer to the sound outlet hole 122 than the second ventilation channel 225. In the wearing state, the first ventilation channel 224 and the second ventilation channel 225 are respectively located at an inner side and an outer side of a contact part between the first noise reduction part 220 and the ear, so that the first ventilation channel 224 communicates with the user's earhole and the noise reduction cavity 400, and the second ventilation channel 225 communicates with the noise reduction cavity 400 and the outside. It can be understood that an outer surface of the cap 200 contacts with the ear to form a relatively closed space, and during wearing, as the cap 200 is inserted into the ear canal, gas in the earhole and the front cavity is squeezed, which results in the occlusion effect generated by increased pressure in the earhole of the user. In this disclosure, the first ventilation channel 224 communicates with the closed space and the noise reduction cavity 400, and the second ventilation channel 225 communicates with the noise reduction cavity 400 and the outside, so that pressure the earhole can be relieved during wearing, thereby avoiding discomfort of the user.

In some implementations, the first ventilation channel 224 is in a form of a through hole penetrating through the first noise reduction part 220, and there may be two first ventilation channels symmetrically provided in a radial direction of the sound outlet hole 122, so as to facilitate relative balance in a pressure relief process. Of course, a number of the first ventilation channels 224 can also be one, three or the like, which is not limited in this disclosure. However, the second ventilation channel 225 is of a through-groove structure penetrating through the outer periphery of the first noise reduction part 220, and a number of the second ventilation channels 225 can also refer to the arrangement form of the first ventilation channels 224. In a case where the second ventilation channel 225 is of the through-groove structure, it has characteristics of convenient processing, increases deformation capacity of the cap 200, and improves comfort during wearing. Preferably, the second ventilation channel 225 and the first ventilation channel 224 can be spaced in a circumferential direction of the cap 200 in this disclosure, so as to avoid adverse effect of reduced structural strength of the cap 200 where the second ventilation channel and the first ventilation channel are located when they are too close.

The same or similar reference numerals in the drawings of examples of the present disclosure correspond to the same or similar parts. In the description of the present disclosure, it is to be understood that the terms "upper", "lower", "left", "right", and the like indicating relationships of directions and positions are based on relationships of directions and positions shown in the drawings, and are intended to be illustrative and simplify descriptions only and not to indicate or imply that the referred device or element must be provided in a particular direction, configured and operated in a particular direction. Therefore, the terms used to describe relationships of positions are intended to be illustrative only and are not intended to limit the present disclosure. For those skilled in the art, specific meanings of the above terms can be understood according to specific situations.

The above are only preferred examples of the present disclosure and are not intended to limit the disclosure. Any modifications, equivalent substitutions, improvements or the like within the spirit and principle of the disclosure should be included in the scope of the disclosure.

What is claimed is:

1. An earphone, comprising:

a main housing;

a sound outlet pipe connected to the main housing;

a cap coupled to the main housing;

a wing arranged around a peripheral side of the main housing; and a pressure relief channel communicating with the sound outlet pipe, wherein:

the pressure relief channel comprises a first channel segment and a second channel segment communicating with each other, the first channel segment is on an outer surface of the sound outlet pipe and communicates with a sound outlet hole of the sound outlet pipe, and the second channel segment is on an outer surface of the main housing.

2. The earphone according to claim 1, wherein an end of the pressure relief channel is exposed to the outside of the earphone.

3. The earphone according to claim 1, wherein:

the cap comprises a fixing part and a first noise reduction part connected to each other, the fixing part is sleeved on the sound outlet pipe and the first noise reduction part is provided around a peripheral side of the fixing part, the wing comprises a second noise reduction part, a cavity is formed between the first noise reduction part and the second noise reduction part, and an end of the second channel segment is configured to communicate with the cavity.

4. The earphone according to claim 3, wherein the first noise reduction part comprises a first ventilation channel and a second ventilation channel.

5. The earphone according to claim 3, wherein the first noise reduction part comprises a first ventilation channel and the second noise reduction part comprises a second ventilation channel.

6. The earphone according to claim 3, wherein an end of the first noise reduction part away from the fixing part abuts against an outer surface of the second noise reduction part.

7. The earphone according to claim 3, wherein hardness of the second noise reduction part is greater than hardness of the first noise reduction part.

8. The earphone according to claim 1, wherein the pressure relief channel comprises an air duct.

9. The earphone according to claim 1, wherein the sound outlet pipe comprises a mounting groove and at least a portion of the pressure relief channel is embedded in the mounting groove.

10. The earphone according to claim 1, wherein the sound outlet pipe comprises a speaker configured to transmit sound via the sound outlet pipe.

11. The earphone according to claim 1, wherein the first channel segment and the second channel segment are respectively formed by recessing a wall surface of the sound outlet pipe and a wall surface of the main housing.

12. An earphone, comprising:

a main housing;

a sound outlet pipe connected to the main housing; and a pressure relief channel communicating with the sound outlet pipe to communicate an ear canal with an external environment, wherein a first portion of the pressure relief channel is on an outer surface of the main housing and a second portion of the pressure relief channel is on an outer surface of the sound outlet pipe, and the second portion of the pressure relief channel communicates with a sound outlet hole of the sound outlet pipe.

13. The earphone according to claim 12, wherein an end of the pressure relief channel is exposed to the outside of the earphone.

14. The earphone according to claim 12, further comprising a cap coupled to the sound outlet pipe.

15. The earphone according to claim 14, wherein:

the cap comprises a fixing part and a first noise reduction part connected to each other, the fixing part is sleeved on the sound outlet pipe and the first noise reduction part is provided around a peripheral side of the fixing part, the earphone further comprises a wing that comprises a second noise reduction part, a cavity is formed between the first noise reduction part and the second noise reduction part.

16. The earphone according to claim 15, wherein the first noise reduction part comprises a first ventilation channel and a second ventilation channel.

17. The earphone according to claim 15, wherein an end of the first noise reduction part away from the fixing part abuts against an outer surface of the second noise reduction part.

18. The earphone according to claim 12, wherein the pressure relief channel comprises an air duct.

19. The earphone according to claim 12, wherein the sound outlet pipe comprises a mounting groove and at least a portion of the pressure relief channel is embedded in the mounting groove.

20. The earphone according to claim 12, wherein the sound outlet pipe comprises a speaker configured to transmit sound via the sound outlet pipe.

* * * * *